(12) United States Patent
Yang et al.

(10) Patent No.: US 8,737,074 B2
(45) Date of Patent: May 27, 2014

(54) MODULAR DIRECT-CURRENT POWER CONVERSION SYSTEM AND DIRECT-CURRENT POWER CONVERSION MODULE THEREOF

(75) Inventors: Ping-Long Yang, Taoyuan County (TW); Chia-Hsiang Li, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 210 days.

(21) Appl. No.: 13/231,334

(22) Filed: Sep. 13, 2011

(65) Prior Publication Data
US 2012/0327604 A1 Dec. 27, 2012

(30) Foreign Application Priority Data

Jun. 21, 2011 (TW) .............................. 100121635 A (51) Int. Cl.
*H05K 7/20* (2006.01)

(52) U.S. Cl.
USPC ...... 361/709; 361/679.54; 361/719; 361/720; 361/721; 361/704; 165/104.33; 165/185; 307/112; 307/147; 363/68; 363/144; 363/146

(58) Field of Classification Search
USPC ....................... 361/679.46, 679.54, 690, 697, 361/702–712, 715–719, 722–728, 802, 807, 361/816, 818; 257/713, 715, 718, 719, 678, 257/686, 696; 165/80.2–80.5, 104.33, 185; 174/15.1, 15.2, 16.3, 252; 307/43, 82, 307/112, 141–149; 363/65–71, 132, 143, 363/147, 39, 101; 29/852, 592.1
See application file for complete search history.

(56) References Cited

U.S. PATENT DOCUMENTS

| | | | | |
|---|---|---|---|---|
| 4,538,073 | A * | 8/1985 | Freige et al. .................... 307/33 |
| 4,766,481 | A * | 8/1988 | Gobrecht et al. ............. 257/664 |
| 5,075,821 | A * | 12/1991 | McDonnal ..................... 361/721 |
| 5,365,403 | A * | 11/1994 | Vinciarelli et al. ........... 361/707 |
| 5,444,298 | A * | 8/1995 | Schutz .......................... 257/691 |
| 5,644,103 | A * | 7/1997 | Pullen et al. .................. 174/541 |
| 6,230,403 | B1 * | 5/2001 | Skoolicas et al. ............... 29/852 |
| 6,549,409 | B1 * | 4/2003 | Saxelby et al. ............... 361/704 |
| 6,903,938 | B2 * | 6/2005 | Waffenschmidt ............. 361/779 |
| 7,236,368 | B2 * | 6/2007 | Maxwell et al. .............. 361/719 |
| 7,289,343 | B2 * | 10/2007 | Rodriguez et al. ............ 363/146 |
| 7,339,287 | B2 * | 3/2008 | Jepsen et al. .................... 307/82 |
| 7,456,602 | B2 * | 11/2008 | Hampo et al. ................. 318/800 |
| 7,697,300 | B2 * | 4/2010 | Brandt et al. ................. 361/736 |
| 7,742,307 | B2 * | 6/2010 | Ellsworth et al. ............. 361/720 |
| 8,376,069 | B2 * | 2/2013 | Nakatsu et al. ............ 180/65.21 |
| 2002/0096759 | A1 * | 7/2002 | Hirano et al. ................. 257/706 |

(Continued)

*Primary Examiner* — Michail V Datskovskiy
(74) *Attorney, Agent, or Firm* — Muncy, Geissler, Olds & Lowe, P.C.

(57) ABSTRACT

A modular direct-current power conversion system is applied to receive a DC input voltage and output a DC output voltage. The modular direct-current power conversion system includes a main board and a plurality of DC power conversion modules. The main board includes a primary surface, a voltage input terminal, a voltage output terminal, a plurality of insertion regions, and a plurality of pin holders. When the DC power conversion module is inserted on the main board, the DC input voltage is inputted via the voltage input terminal to the DC power conversion module. The DC power conversion module converts the DC input voltage into a DC output voltage, and the DC output voltage is outputted via the voltage output terminal.

10 Claims, 5 Drawing Sheets

(56) References Cited

U.S. PATENT DOCUMENTS

| | | | |
|---|---|---|---|
| 2003/0035278 A1* | 2/2003 | Lawlyes et al. | 361/796 |
| 2004/0218375 A1* | 11/2004 | Fronk | 361/813 |
| 2005/0162875 A1* | 7/2005 | Rodriguez et al. | 363/68 |
| 2007/0115643 A1* | 5/2007 | Chen et al. | 361/719 |
| 2009/0185352 A1* | 7/2009 | Ellsworth et al. | 361/720 |
| 2011/0192568 A1* | 8/2011 | Hsieh et al. | 165/48.1 |
| 2011/0267023 A1* | 11/2011 | Muto et al. | 323/304 |

* cited by examiner

MODULAR DIRECT-CURRENT POWER CONVERSION SYSTEM AND DIRECT-CURRENT POWER CONVERSION MODULE THEREOF

BACKGROUND OF THE INVENTION

1. Field of the Invention

The present invention relates generally to a DC power conversion system, and more particularly to a modular DC power conversion system and a DC power conversion module thereof.

2. Description of Prior Art

Figure 1:
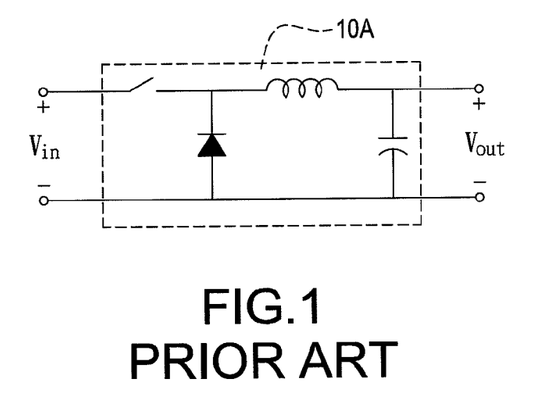
FIG. 1 is a block diagram of a prior art DC power converter.

Reference is made to FIG. 1 which is a block diagram of a prior art DC power converter. The DC power converter 10A receives a DC input voltage Vin and converts the DC input voltage Vin into a DC output voltage Vout. In particular, the DC power converter 10A is usually arranged on a printed circuit board (PCB). Hence, a major advantage of using single DC power converter to produce the DC output voltage is that the circuit topology is uncomplicated. However, output power of the single DC power converter is limited. Also, the operation of the whole power conversion system will be affected if the DC power converter 10A is malfunctioned.

Figure 2:
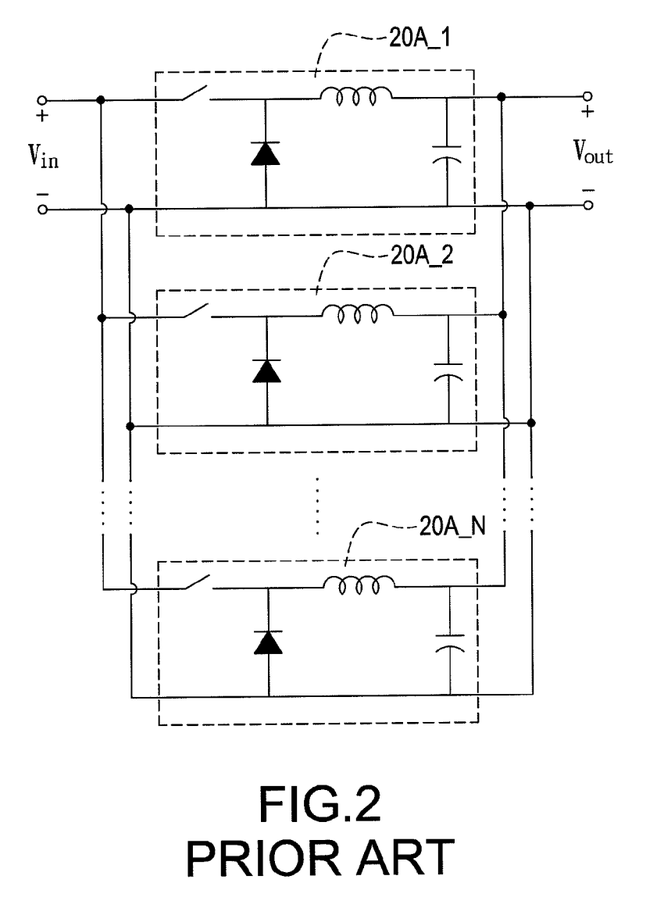
FIG. 2 is a schematic block diagram of a plurality of prior art DC power converters connected in parallel to each other.

In addition, multiple DC power converters electrically connected in parallel to each other are used to meet the demand of increasing output power, as shown in FIG. 2. The amount of the DC power converters 20A_1~20A_N is determined and arranged on the printed circuit board at one time to produce the output power according to the required power of the system loads, thus increasing the output power. If any one of the DC power converters 20A_1~20A_N causes the electrical failure, however, the PCB assemble with the DC power converters 20A_1~20A_N has to be thrown away, thus significantly increasing the costs and reducing reliability of the whole system. Also, the competition of the converter products is poor due to longer time of developing, designing, testing thereof.

Accordingly, it is desirable to provide a modular DC power conversion system to achieve the advantages of high expansion, high reliability, high stability, and high efficiency by modularizing the DC power converters.

SUMMARY OF THE INVENTION

An object of the invention is to provide a DC power conversion module to solve the above-mentioned problems.

The DC power conversion module receives a DC input voltage to produce a DC output voltage. The DC power conversion module includes a plate, a DC/DC converter, and a heat sink.

The plate has a first surface and a second surface opposite to the first surface. The DC/DC converter is electrically connected on the first surface of the plate to convert a voltage level of the DC input voltage and produce the DC output voltage. The heat sink is installed on the second surface of the plate to provide heat dissipation for the DC/DC converter.

Another object of the invention is to provide a modular DC power conversion system to solve the above-mentioned problems.

The modular DC power conversion system receives a DC input voltage to produce a DC output voltage. The modular DC power conversion system includes a main board and a plurality of DC power conversion modules.

The main board has a main surface, a voltage input terminal, a voltage output terminal, a plurality of insertion regions, and a plurality of pin holders. The voltage input terminal is installed on the main surface of the main board. The voltage output terminal is installed on the main surface of the main board. The insertion regions are disposed on the main surface of the main board. The pin holders are installed on the main surface of the main board and oppositely disposed on two sides of the corresponding insertion regions.

Each DC power conversion module has a plate, a DC/DC converter, a heat sink, and a plurality of pins. The plate has a first surface and a second surface opposite to the first surface. The DC/DC converter is electrically connected on the first surface of the plate to convert a voltage level of the DC input voltage and produce the DC output voltage. The heat sink is disposed on the second surface of the plate to provide heat dissipation for the DC/DC converter. The pins are installed on two opposite sides of the first surface of the plate in a two-row arrangement.

Wherein the DC input voltage is inputted via the voltage input terminal of the main board when the pins are inserted in the corresponding pin holders. The voltage level of the DC input voltage is converted by the DC power conversion modules, and the converted DC input voltage is outputted via the voltage output terminal of the main board.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Reference will now be made to the drawing figures to describe the present invention in detail.

Figure 3:
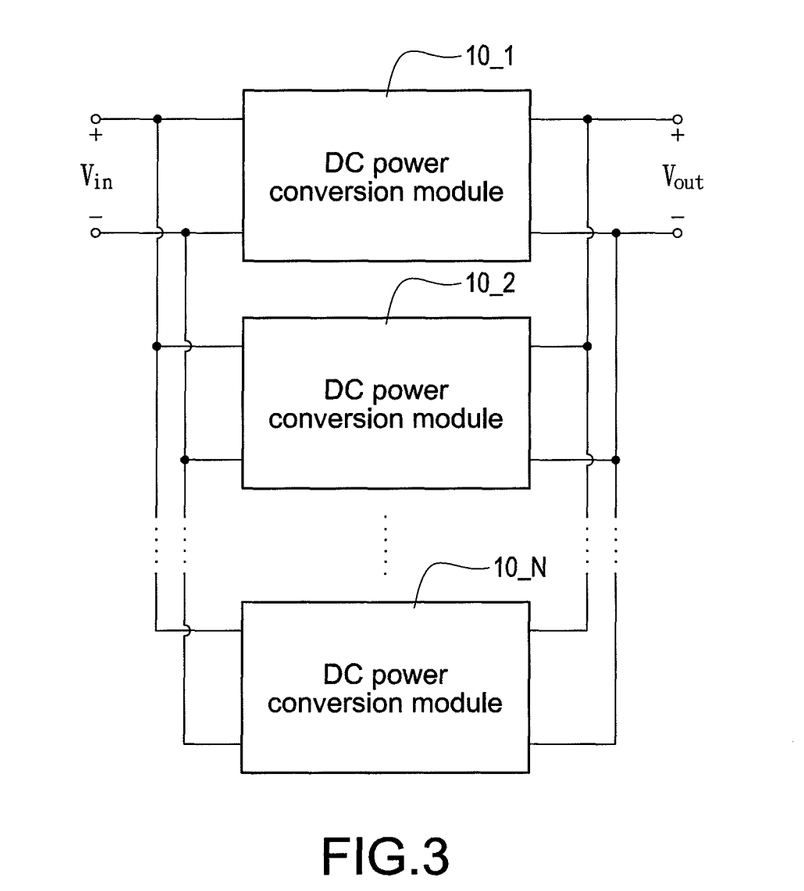
FIG. 3 is a schematic block diagram of a plurality of DC power conversion modules connected in parallel to each other according to the present invention.

Reference is made to FIG. 3 which is a schematic block diagram of a plurality of DC power conversion modules connected in parallel to each other according to the present invention. The DC power conversion modules 10_1~10_N are electrically connected in parallel to each other and receive an external DC input voltage Vin. The DC power conversion modules 10_1~10_N convert a voltage level of the DC input voltage Vin and produce a DC output voltage Vout. Each of the DC power conversion modules 10_1~10_N can be a buck converter to decrease the voltage level of the DC input voltage Vin. Also, each of the DC power conversion modules 10_1~10_N can be a boost converter to increase the voltage level of the DC input voltage Vin. Furthermore, each of the DC power conversion modules 10_1~10_N can be a buck-boost converter to decrease and increase the voltage level of the DC input voltage Vin. In this embodiment, the step-down DC power conversion modules 10_1~10_N are exemplified for further demonstration and not for limitation. Typically, the 18-volt DC input voltage Vin is converted into the 12-voltage DC output voltage Vout.

In practical applications, the amount of using the DC power conversion modules 10_1~10_N is determined according to the required power of the system loads, thus the expansion of the DC power conversion modules 10_1~10_N can be implemented. In addition, each of the DC power conversion modules 10_1~10_N is a high-power-output power conversion module. In this embodiment, the rated output power of each DC power conversion modules 10_1~10_N is 1,000 watts. Hence, only one DC power conversion module needs to be used if the required power of the system loads is less than 1,000 watts. If the required power of the system loads is greater than 1,000 watts but less than 2,000 watts, two DC power conversion modules can be installed to able to provide enough output power. Accordingly, the amount of using the DC power conversion modules 10_1~10_N can be determined and expanded according to the required power of the system loads.

Figure 4A:
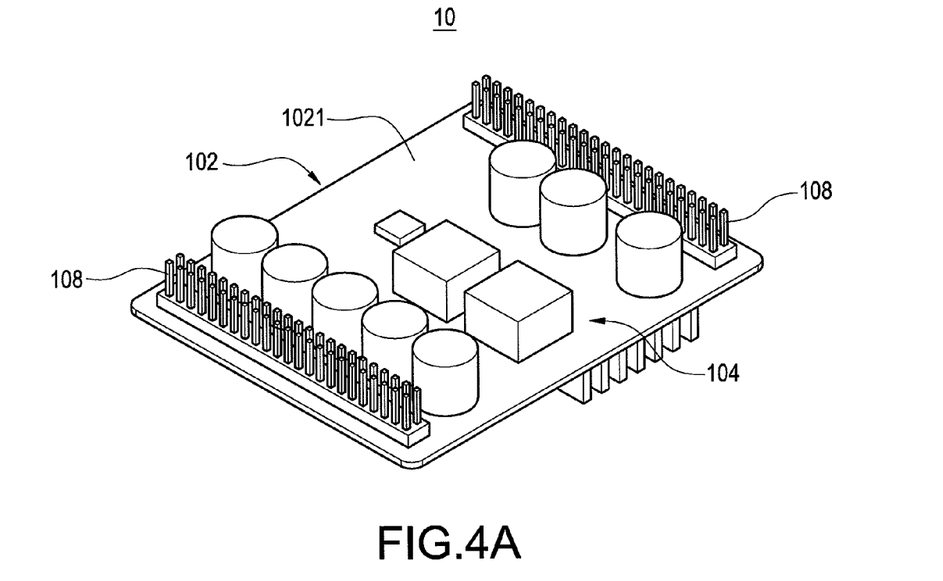
FIG. 4A is a perspective schematic view of showing one side of the DC power conversion module according to the present invention.
Figure 4B:
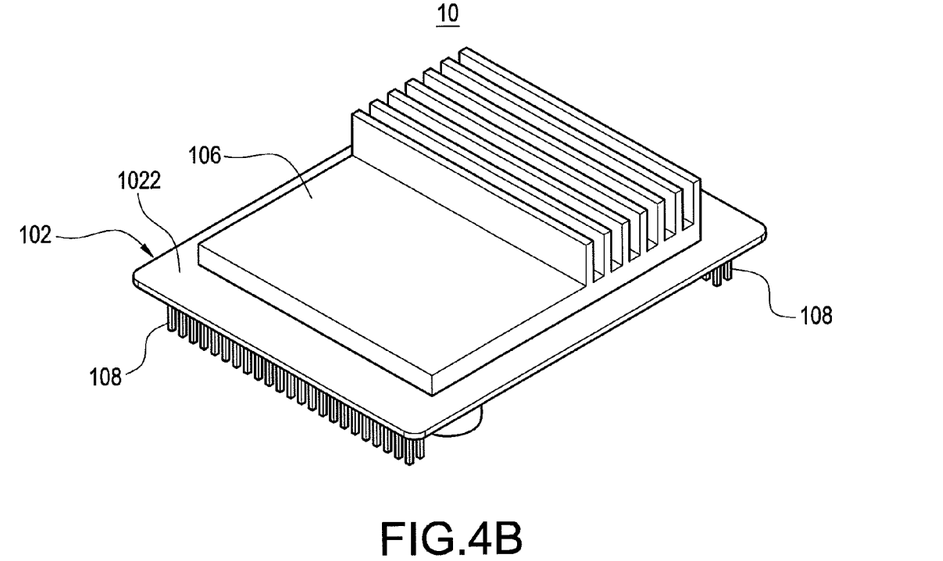
FIG. 4B is a perspective schematic view of showing the other side of the DC power conversion module according to the present invention.

Reference is made to FIG. 4A and FIG. 4B which are a perspective schematic view of showing one side and the other side of the DC power conversion module according to the present invention, respectively. The DC power converter module 10 receives a DC input voltage Vin and outputs a DC output voltage Vout. In particular, the DC power converter module 10 is one of the DC power conversion modules 10_1~10_N shown in FIG. 3. The DC power converter module 10 includes a plate 102, a DC/DC converter 104, and a heat sink 106.

The plate 102 has a first surface 1021 and a second surface 1022 opposite to the first surface 1021. The plate 102 can be a multi-layer printed circuit board. The DC/DC converter 104 is electrically connected on the first surface 1021 of the plate 102 to convert the voltage level of the DC input voltage Vin and produce the DC output voltage Vout. In particular, the DC/DC converter 104 can be a buck converter, a boost converter, a buck-boost converter, or a high-frequency power converter. Hence, the DC/DC converter 104 is a converter topology composed of capacitor(s), inductor(s), switch(s), and diode(s). The heat sink 106 is installed on the second surface 1022 of the plate 102 to provide heat dissipation for the DC/DC converter 104.

Especially to deserve to be mentioned, the DC power conversion module 10 is preferably operated by a pulse-width modulation (PWM) control scheme with a frequency that is greater than 400 kilohertz so that DC/DC converter 104 can be minified. Furthermore, the DC power conversion module 10 can output up to 1,000 watts in a 1U height (about four centimeters).

In addition, two major issues of operating the DC/DC converter 104 at a high-frequency condition ¬: a heat dissipation issue and an electromagnetic interference issue can be overcome in the present invention.

1. The heat dissipation issue. The heat sink 106 is installed on the second surface 1022 of the plate 102 to provide heat dissipation for the DC/DC converter 104. In addition, the first surface 1021 and the second surface 1022 of the plate 102 can be efficiently utilized to minify the volume of the DC power conversion module 10 because the heat sink 106 is installed on the second surface 1022 of the plate 102 (compared to the composed elements of the DC/DC converter 104 disposed on the first surface 1021 of the plate 102).

2. The electromagnetic interference issue. The electromagnetic interference produced from the DC power conversion module 10 can be restrained through shielding layers (including signal layers, ground layers, and power layers) of the plate 102 with a multi-layer structure, such as a multi-layer printed circuit board.

Another modular DC power conversion system is disclosed in the present invention. The modular DC power conversion system receives a DC input voltage Vin and produces a DC output voltage Vout. The modular DC power conversion system 20 includes a main board 202 and a plurality of DC power conversion modules 10.

Figure 5:
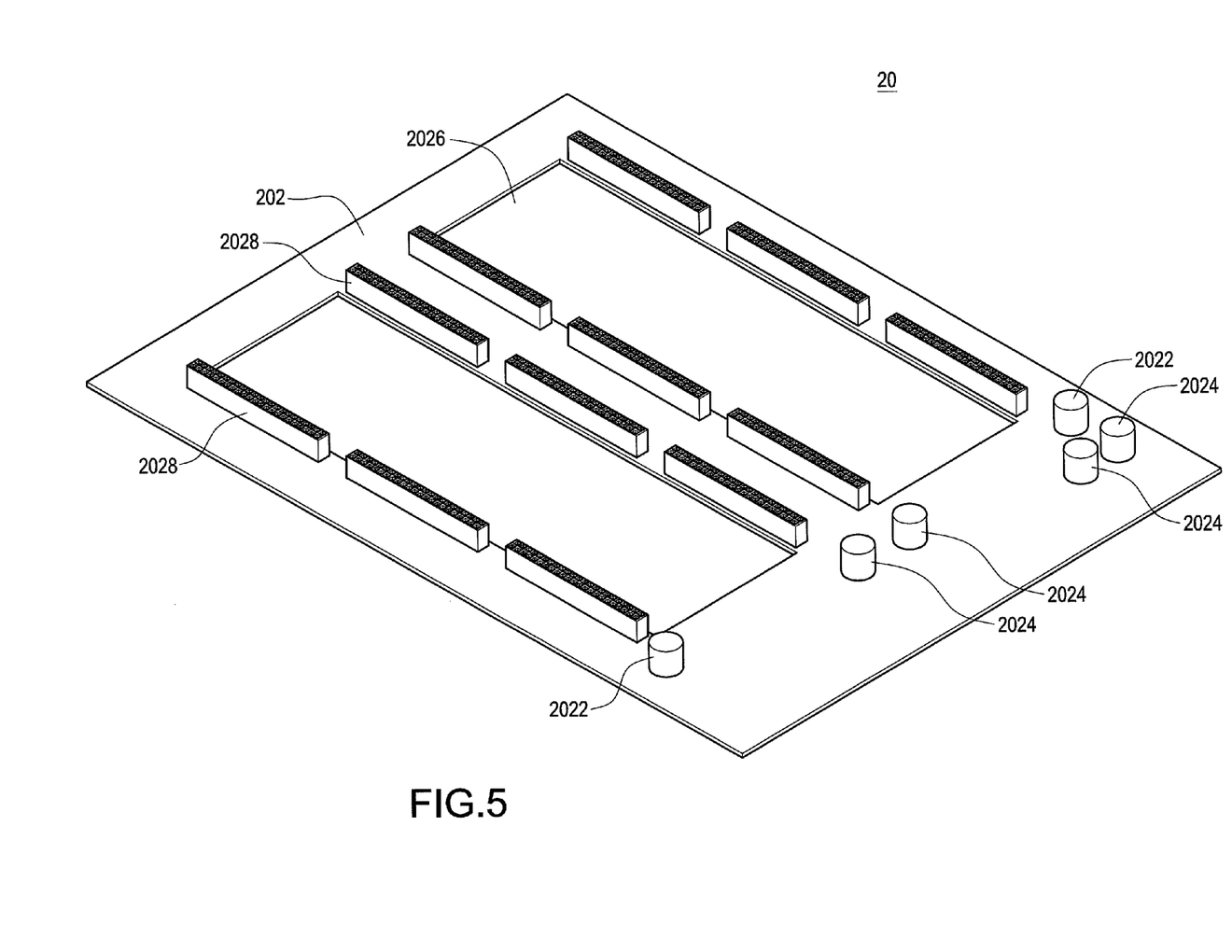
FIG. 5 is a perspective schematic view of showing one side of a main board according to the present invention.

Reference is made to FIG. 5 which is a perspective schematic view of showing one side of a main board 202 according to the present invention. The main board 202 has a main surface (not labeled), a voltage input terminal 2022, a voltage output terminal 2024, a plurality of insertion regions 2026, and a plurality of pin holders 2028. The voltage input terminal 2022, the voltage output terminal 2024, and the pin holders 2028 are installed on the main surface of the main board 202. In particular, every two pin holders 2028 are installed on one insertion region 2026 and oppositely disposed on two sides of the insertion region 2026.

As shown in FIG. 4A and FIG. 4B, each of the DC power conversion modules 10 includes a plate 102, a DC/DC converter 104, a heat sink 106, and a plurality of pins 108. The plate 102 has a first surface 1021 and a second surface 1022 opposite to the first surface 1021. The plate 102 can be a multi-layer printed circuit board. The DC/DC converter 104 is electrically connected on the first surface 1021 of the plate 102 to convert the voltage level of the DC input voltage Vin and produce the DC output voltage Vout. In particular, the DC/DC converter 104 can be a buck converter, a boost converter, a buck-boost converter, or a high-frequency power converter. Hence, the DC/DC converter 104 is a converter topology composed of capacitor(s), inductor(s), switch(s), and diode(s). In particular, the DC power conversion module 10 is preferably operated by a pulse-width modulation (PWM) control scheme with a frequency that is greater than 400 kilohertz. The heat sink 106 is installed on the second surface 1022 of the plate 102 to provide heat dissipation for the DC/DC converter 104. The pins 108 are installed on two opposite sides of the first surface 1021 of the plate 102 in a two-row arrangement.

The DC input voltage Vin is inputted via the voltage input terminal 2022 of the main board 202 when the pins 108 of the DC power conversion modules 10 are inserted in the corresponding pin holders 2028. The voltage level of the DC input voltage Vin is converted by the DC power conversion modules 10, and the converted DC input voltage Vin is outputted via the voltage output terminal 2024 of the main board 202.

Figure 6:
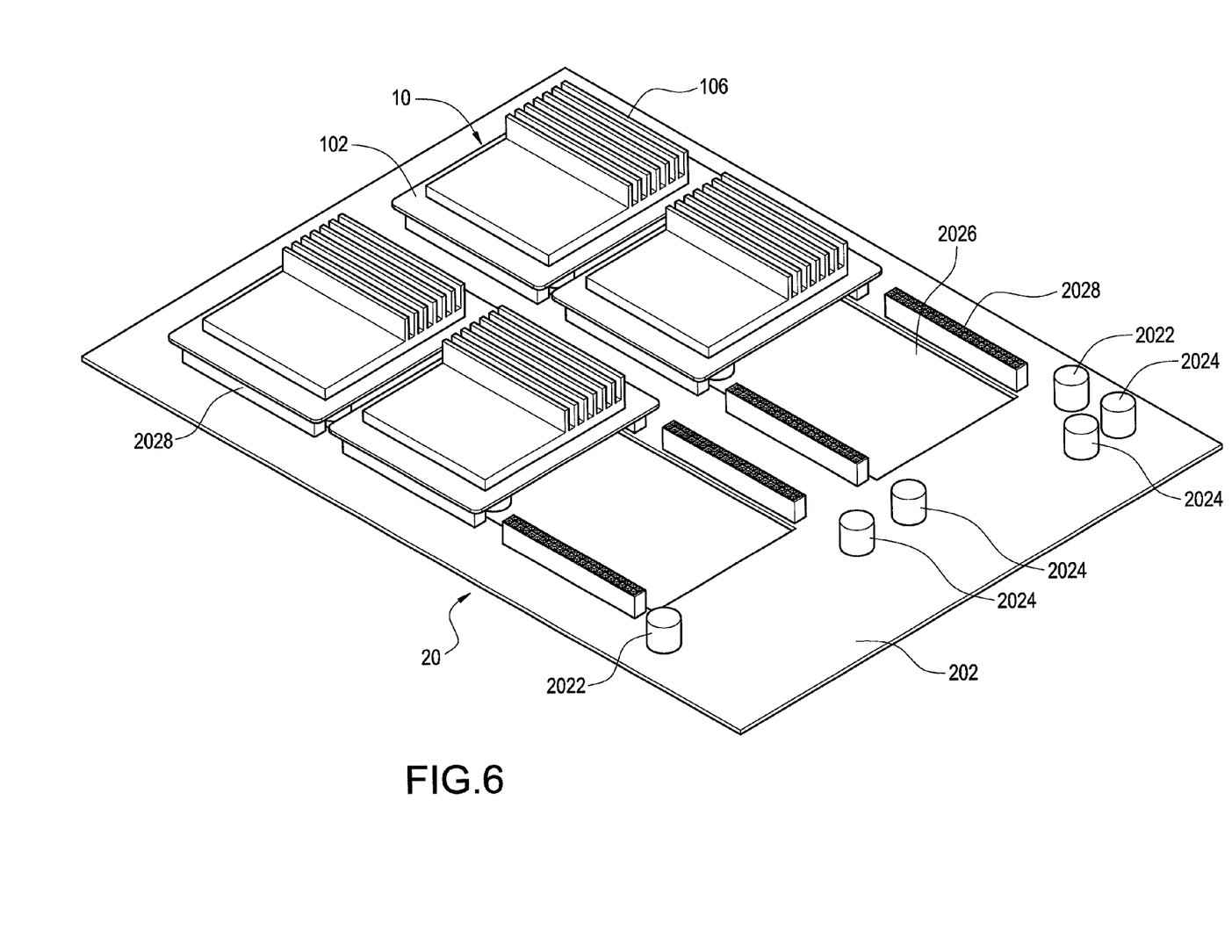
FIG. 6 is a perspective schematic view of fabricating the DC power conversion modules on the main board according to the present invention.

Reference is made to FIG. 6 which is a perspective schematic view of fabricating the DC power conversion modules on the main board 202 according to the present invention. In this embodiment, the main board 202 has six insertion regions 2026 in which four are inserted through four DC power conversion modules 10. The amount of using the DC power conversion modules 10 is determined according to the required power of the system loads. Especially to deserve to be mentioned, each DC power conversion module 10 can be inserted on any one of the insertion regions 2026. In this embodiment, as shown in FIG. 6, the four DC power conversion modules 10 are inserted on the upper four insertion regions 2026, but not limited. That is, other DC power conversion modules 10 can be expanded to be installed on empty insertion regions 2016 when the required power of the system loads is increased.

Because the DC power conversion modules 10 are electrically connected in parallel to each other, the user can change the insertion regions 2026 of the DC power conversion modules 10 according to the practical applications, thus increasing flexibility of using the modular DC power conversion system 20. If any one of the pin holders 2028 causes the electrical failure, the other normal pin holders 2028 are used and the abnormal pin holder 2028 is temporarily ignored to be repaired or replaced. Because each of the DC power conversion modules 10 can be independently operated, the abnormal DC power conversion module 10 can be directly replaced by a new/normal one if any one of the DC power conversion modules 10 malfunctions. Especially to deserve to be mentioned, only the abnormal DC power conversion module 10 is unavailable that will not affect the operation of the whole modular DC power conversion system 20. Before the DC power conversion module 10 is inserted on the main board 202, the DC power conversion module 10 can be tested to increase reliability of the modular DC power conversion system 20.

In addition, two major issues of operating the DC/DC converter 104 at a high-frequency condition: a heat dissipation issue and an electromagnetic interference issue can be overcome in the present invention.

1. The heat dissipation issue. The heat sink 106 is installed on the second surface 1022 of the plate 102 to provide heat dissipation for the DC/DC converter 104. In addition, the first surface 1021 and the second surface 1022 of the plate 102 can be efficiently utilized to minify the volume of the DC power conversion module 10 because the heat sink 106 is installed on the second surface 1022 of the plate 102 (compared to the composed elements of the DC/DC converter 104 disposed on the first surface 1021 of the plate 102).

2. The electromagnetic interference issue. The electromagnetic interference produced from the DC power conversion module 10 can be restrained through shielding layers (including signal layers, ground layers, and power layers) of the plate 102 with a multi-layer structure, such as a multi-layer printed circuit board.

In conclusion, the present invention has following advantages:

1. Modulation and high extension—A modular DC power conversion circuit is arranged on a printed circuit board to be independently operated. Consequently, the DC power conversion modules can be expanded according to the required power of the system loads to increase flexibility of the modular DC power conversion system by easily assembling and disassembling the DC power conversion modules;

2. High-frequency operation and miniaturization—The modular DC power conversion system can be minified by operating the DC/DC converter with a frequency that is greater than 400 kilohertz;

3. High output power—A number of DC power conversion modules are integrated and installed on a main board to provide higher power output;

4. High reliability—Before the DC power conversion module is inserted on the main board, the DC power conversion module can be tested to increase reliability of the modular DC power conversion system;

5. High efficiency—The plate is a multi-layer printed circuit board to restrain electromagnetic interference through shielding layers of the multi-layer printed circuit board, thus increasing conversion efficiency of modular DC power conversion system; and 6. High stability—The heat sink is installed on the second surface of the plate to provide heat dissipation by designing a desirable air passage to increase stability of operating the modular DC power conversion system.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A DC power conversion module disposed on a main board for receiving a DC input voltage to produce a DC output voltage, the DC power conversion module comprising:
   a plate having a first surface and a second surface;
   a DC/DC converter electrically connected and exposed to the first surface to convert a voltage level of the DC input voltage for producing the DC output voltage;
   a heat sink installed and exposed on the second surface of the plate to provide heat dissipation for the DC/DC converter; and
   a plurality of pins installed on two opposite sides of the first surface in a two-row arrangement to provide an electrical connection between the DC power conversion module and the main board.

2. The DC power conversion module of claim 1, wherein the DC/DC converter is a buck converter, a boost converter, a buck-boost converter, or a high-frequency power converter to increase or decrease the voltage level of the DC input voltage.

3. The DC power conversion module of claim 1, wherein the plate is a multi-layer printed circuit board to restrain electromagnetic interference through shielding layers of the multi-layer printed circuit board.

4. The DC power conversion module of claim 1, wherein the DC/DC converter is operated by a pulse-width modulation control scheme with a frequency that is greater than 400 kilohertz.

5. A modular DC power conversion system receiving a DC input voltage to produce a DC output voltage, the modular DC power conversion system comprising:
   a main board having:
   a main surface;
   a voltage input terminal installed on, the main surface;
   a voltage output terminal installed on the main surface;
   a plurality of insertion regions disposed on the main surface;
   a plurality of pin holders installed on the main surface and installed on two opposite sides of the corresponding insertion regions in a two-row arrangement;
   a plurality of DC power conversion modules, each DC power conversion module comprising:
   a plate having a first surface and a second surface;
   a DC/DC converter electrically connected and exposed to the first surface to convert a voltage level of the DC input voltage for producing the DC output voltage;
   a heat sink disposed and exposed on the second surface to provide heat dissipation for the DC/DC converter; and
   a plurality of pins installed on two opposite sides of the first surface in a two-row arrangement to provide electrical connections between the DC power conversion modules and the main board;

wherein the DC input voltage is inputted via the voltage input terminal of the main board when the pins are inserted in the corresponding pin holders; the voltage level of the DC input voltage is converted by the DC power conversion modules, and then output the converted DC input voltage from the voltage output terminal of the main board.

6. The modular DC power conversion system of claim 5, wherein the DC power conversion modules are electrically connected in parallel to each other.

7. The modular DC power conversion system of claim 5, wherein the main board is a multi-layer printed circuit board.

8. The modular DC power conversion system of claim 5, wherein the plate is a multi-layer printed circuit board to restrain electromagnetic interference through shielding layers of the multi-layer printed circuit board.

9. The modular DC power conversion system of claim 5, wherein the DC/DC converter is a buck converter, a boost converter, a buck-boost converter, or a high-frequency power converter to increase or decrease the voltage level of the DC input voltage.

10. The modular DC power conversion system of claim 5, wherein the DC/DC converter is operated by a pulse-width modulation control scheme with a frequency that is greater than 400 kilohertz.

* * * * *